US009626188B2

(12) United States Patent
Gschwind

(10) Patent No.: US 9,626,188 B2
(45) Date of Patent: *Apr. 18, 2017

(54) RELATIVE OFFSET BRANCHING IN A FIXED-WIDTH REDUCED INSTRUCTION SET COMPUTING ARCHITECTURE

(71) Applicant: International Business Machines Corporation, Armonk, NY (US)

(72) Inventor: Michael K. Gschwind, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 260 days.

This patent is subject to a terminal disclaimer.

(21) Appl. No.: 14/478,114

(22) Filed: Sep. 5, 2014

(65) Prior Publication Data

US 2015/0347148 A1 Dec. 3, 2015

Related U.S. Application Data

(63) Continuation of application No. 14/291,693, filed on May 30, 2014.

(51) Int. Cl.
 *G06F 9/32* (2006.01)
 *G06F 9/42* (2006.01)
 (Continued)

(52) U.S. Cl.
 CPC .......... *G06F 9/3806* (2013.01); *G06F 9/3012* (2013.01); *G06F 9/30058* (2013.01);
 (Continued)

(58) Field of Classification Search
 CPC .. G06F 9/3806; G06F 9/30058; G06F 9/3012; G06F 9/30145; G06F 9/3804;
 (Continued)

(56) References Cited

U.S. PATENT DOCUMENTS 5,812,839 A * 9/1998 Hoyt ...................... G06F 9/3806
 712/235
6,336,178 B1 * 1/2002 Favor ........................ G06F 7/74
 712/209

(Continued)

OTHER PUBLICATIONS

List of IBM Patents or Patent Applications Treated as Related; Sep. 5, 2014, 2 pages.

(Continued)

*Primary Examiner* — Daniel Pan
(74) *Attorney, Agent, or Firm* — Cantor Colburn LLP; Steven Bennett

(57) ABSTRACT

Embodiments relate to a method and computer program product for relative offset branching in a reduced instruction set computing (RISC) architecture. One aspect is a method that includes fetching a branch instruction from an instruction stream having a fixed instruction width. A relative offset value is acquired from the instruction stream. The relative offset value is formatted as an offset relative to a program counter value and sized as a multiple of the fixed instruction width. The relative offset value is added with the program counter value to form a branch target address value. The branch target address value is loaded into a program counter based on the branch instruction. Execution of the instruction stream is redirected to a next instruction based on the branch target address value in the program counter.

14 Claims, 9 Drawing Sheets

(51) Int. Cl.
*G06F 9/38* (2006.01)
*G06F 9/30* (2006.01)
*G06F 9/44* (2006.01)
*G06F 9/35* (2006.01)
*G06F 9/355* (2006.01)

(52) U.S. Cl.
CPC .......... *G06F 9/30145* (2013.01); *G06F 9/324* (2013.01); *G06F 9/3804* (2013.01); *G06F 9/30181* (2013.01); *G06F 9/35* (2013.01); *G06F 9/355* (2013.01); *G06F 9/3557* (2013.01); *G06F 9/3808* (2013.01); *G06F 9/3842* (2013.01); *G06F 9/3844* (2013.01); *G06F 9/3846* (2013.01); *G06F 9/4426* (2013.01)

(58) Field of Classification Search
CPC . G06F 9/324; G06F 9/35; G06F 9/355; G06F 9/3557; G06F 9/3808; G06F 9/3836; G06F 9/3842; G06F 9/3844; G06F 9/3846; G06F 9/3848; G06F 9/30181; G06F 9/4426
USPC ........................... 712/238, 239, 41, 242, 243
See application file for complete search history.

(56) References Cited

U.S. PATENT DOCUMENTS

| | | | | |
|---|---|---|---|---|
| 6,502,188 | B1* | 12/2002 | Zuraski, Jr. ........... | G06F 9/3806 711/125 |
| 6,661,534 | B1* | 12/2003 | Ravi ...................... | G06K 15/00 358/1.18 |
| 2011/0314265 | A1* | 12/2011 | Ball ..................... | G06F 9/30149 712/234 |
| 2015/0347145 | A1* | 12/2015 | Gschwind ............. | G06F 9/3804 712/207 |
| 2015/0347146 | A1* | 12/2015 | Gschwind ............. | G06F 9/3804 712/207 |
| 2015/0347148 | A1* | 12/2015 | Gschwind ............. | G06F 9/3804 712/238 |

OTHER PUBLICATIONS

U.S. Appl. No. 14/291,627, filed May 30, 2014.
U.S. Appl. No. 14/291,693, filed May 30, 2014.
U.S. Appl. No. 14/478,093, filed Sep. 5, 2014.

\* cited by examiner

RELATIVE OFFSET BRANCHING IN A FIXED-WIDTH REDUCED INSTRUCTION SET COMPUTING ARCHITECTURE

DOMESTIC PRIORITY

This application is a continuation of U.S. application Ser. No. 14/291,693 filed May 30, 2014, the disclosure of which is incorporated by reference herein in its entirety.

BACKGROUND

The present invention relates generally to computer systems, and more specifically, to relative offset branching in a fixed-width reduced instruction set computing architecture.

In a computer system with a reduced instruction set computing (RISC) architecture, higher performance is achieved based on instruction simplicity to increase instruction execution rate. A RISC architecture typically includes a smaller optimized instruction set rather than a large number of specialized instructions that may be implemented in a complex instruction set computing (CISC) architecture. For RISC and CISC instructions, each instruction word typically includes an operation code (op-code) and one or more operands. One characteristic of a CISC architecture includes support for variable length instruction words. For example, a CISC architecture may include 32-bit instruction words, 48-bit instruction words, 64-bit instruction words, 80-bit instruction words, and the like. In contrast, RISC instruction words typically have a fixed instruction word width, such as 32 bits. A CISC architecture typically also supports a larger number of registers, includes complex addressing modes, and may require dozens of cycles to execute a single instruction.

A variety of branch instruction types may be defined in a RISC architecture as different branch instruction word formats. For instance, a displacement branch instruction adds a specified displacement defined in a displacement branch instruction word to the address of the displacement branch instruction. An absolute address branch instruction uses an absolute address included in an absolute address branch instruction word as an absolute address branch target address and pads remaining address bits with zeroes. A number of register-based branch instructions can also be defined where one or more registers are identified in a register-based branch instruction word, and values in the one or more registers are used to compute a branch target address. Typically, in a RISC architecture, branches that span a large address range employ register-based branch instructions, while branches that span a shorter address range or target a lower address range can employ a displacement or absolute address branch instruction. The fixed instruction word width in a RISC architecture can limit the number of address bits available for a displacement or absolute address branch instruction to the instruction word width less an op-code size.

SUMMARY

Embodiments include a method and computer program product for relative offset branching in a reduced instruction set computing (RISC) architecture. One aspect is a method that includes fetching a branch instruction from an instruction stream having a fixed instruction width. A relative offset value is acquired from the instruction stream. The relative offset value is formatted as an offset relative to a program counter value and sized as a multiple of the fixed instruction width. The relative offset value is added with the program counter value to form a branch target address value. The branch target address value is loaded into a program counter based on the branch instruction. Execution of the instruction stream is redirected to a next instruction based on the branch target address value in the program counter.

A further aspect is a computer program product for implementing relative offset branching in a RISC architecture. The computer program product includes a computer readable storage medium having program instructions embodied therewith. The program instructions are readable by a processing circuit to cause the processing circuit to perform a method that includes fetching a branch instruction from an instruction stream having a fixed instruction width. A relative offset value is acquired from the instruction stream. The relative offset value is formatted as an offset relative to a program counter value and sized as a multiple of the fixed instruction width. The relative offset value is added with the program counter value to form a branch target address value. The branch target address value is loaded into a program counter based on the branch instruction. Execution of the instruction stream is redirected to a next instruction based on the branch target address value in the program counter.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Embodiments provide a relative offset branch instruction in a reduced instruction set computing (RISC) architecture that supports long branches. In an exemplary embodiment, a RISC processor operates according to an instruction set defined by instruction words having a fixed width for all instructions, such as 32-bit instruction words. Rather than including a relative offset value within the instruction word, the relative offset value follows the branch instruction word with which it is associated. For example, in a typical 32-bit instruction word, there may be only 26 bits available for an operand, as the remaining bits define an operation code (op-code) and/or other information. In order to support long relative branching anywhere within a full address range of a computer system, a value that is a multiple of an instruction word width is injected into a fixed-width instruction stream. For instance, if a 32-bit address range is supported and the instruction word width is 32 bits, then a 32-bit value following a relative offset branch instruction can be used as a 32-bit offset to form a target address for the branch. As a further example, if a 64-bit address range is supported and the instruction word width is 64 bits, then a 64-bit value following a relative offset branch instruction can be used as a 64-bit offset to form a target address for the branch. Embodiments may also support 64-bit offsets with 32-bit instruction words by using two instruction word slots.

Computing environments of different architectures may incorporate and use one or more aspects provided herein. For instance, environments based on the PowerPC architecture, also referred to as Power ISA, offered by International Business Machines Corporation and described in the Power ISA™ Version 2.07 specification, May 3, 2013, incorporated herein by reference in its entirety, may include one or more aspects.

Figure 1:
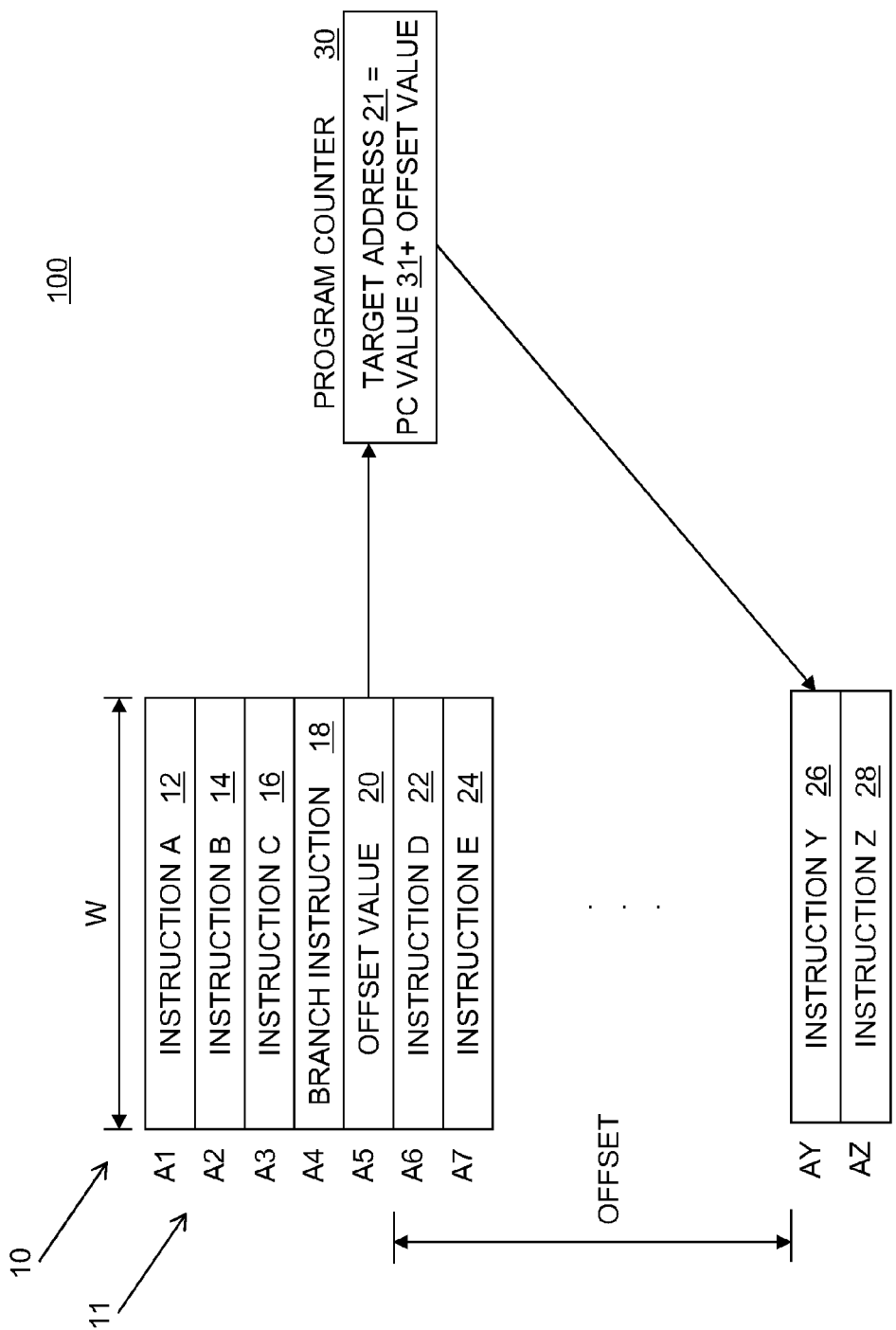
FIG. 1 depicts a sequence of instructions including a relative offset branch instruction in accordance with an embodiment.

Turning now to FIG. 1, a sequence of instructions 10 in a computer system 100 is depicted in accordance with an embodiment. The sequence of instructions 10 is also referred to as instruction stream 10. The sequence of instructions 10 may reside in memory 11, such as a cache memory or main memory of the computer system 100. In the example of FIG. 1, the sequence of instructions 10 includes: instruction A 12 at address A1, instruction B 14 at address A2, instruction C 16 at address A3, branch instruction 18 at address A4, a relative offset value 20 at location A5, instruction D 22 at address A6, instruction E 24 at address A7 continuing through instruction Y 26 at address AY and instruction Z 28 at address AZ. Each of the instructions 12-18 and 22-28 is a fixed-width instruction word of W bits. The branch instruction 18 is a relative offset branch instruction that relies upon the relative offset value 20, where the relative offset value 20 is located at a separate address and is not in the same instruction word as the branch instruction 18.

In the example of FIG. 1, the relative offset value 20 is also of width W and thus supports a larger address range than a branch instruction which includes both an op-code and an associated target address within the same width W. Any number of address bits up to W bits can be defined in the relative offset value 20 to support relative long branches. The relative offset value 20 is formatted as an offset relative to a program counter value 31. The relative offset value 20 is added to the program counter value 31 to form a branch target address value 21. The branch target address value 21 is loaded into a program counter 30 to redirect execution of the instruction stream 10 to instruction Y 26 at address AY as the next instruction rather than a next sequential instruction after the branch instruction 18, i.e. instruction D 22 at address A6. The program counter 30 is an example of a register that tracks where the computer system 100 is in the instruction stream 10. Although the term "program counter" is used herein, the program counter 30 may represent any counter or pointer that tracks a location for instruction fetching, decoding, and execution, such as an instruction pointer, an instruction counter, a current instruction address, a next instruction address, and other similar structure known in the art.

The program counter value 31 to which the relative offset value 20 is added can vary depending upon implementation. For example, the program counter value 31 can be address A4 (branch instruction address), address A5 (relative offset value address), or address A6 (next sequential instruction address). Using address A4 as the program counter value 31 can enable infinite looping where the relative offset value 20 is zero. Using address A5 as the program counter value 31 can simplify implementation where address A5 as a most recently accessed address. Using the next sequential instruction address A6 as the program counter value 31 can provide a larger addressable range if only positive values of the relative offset value 20 are supported, where a relative offset value 20 of zero would map to the next sequential instruction address A6. In various embodiments, the relative offset value 20 can be an unsigned value or a signed value. An unsigned value provides a greater potential range in one direction, while a signed value supports branches to both lower and higher address values.

To further expand a potentially accessible range, the relative offset value 20 may be stored as a word address rather than a byte address. For example, if the computer system supports 8-bit byte addressing and the instruction word width W is 32-bits, the relative offset value 20 can support a 34-bit range of offset by storing an address as a word address rather than a byte address. In other words, a value of "1" stored in the relative offset value 20 would map to an address of "4", a value of "2" stored in the relative offset value 20 would map to an address of "8", and so forth. Translation from a word address to a byte address can be performed as part of adding the relative offset value 20 to the program counter value 31. Other address translation operations may also be supported.

Figure 2:
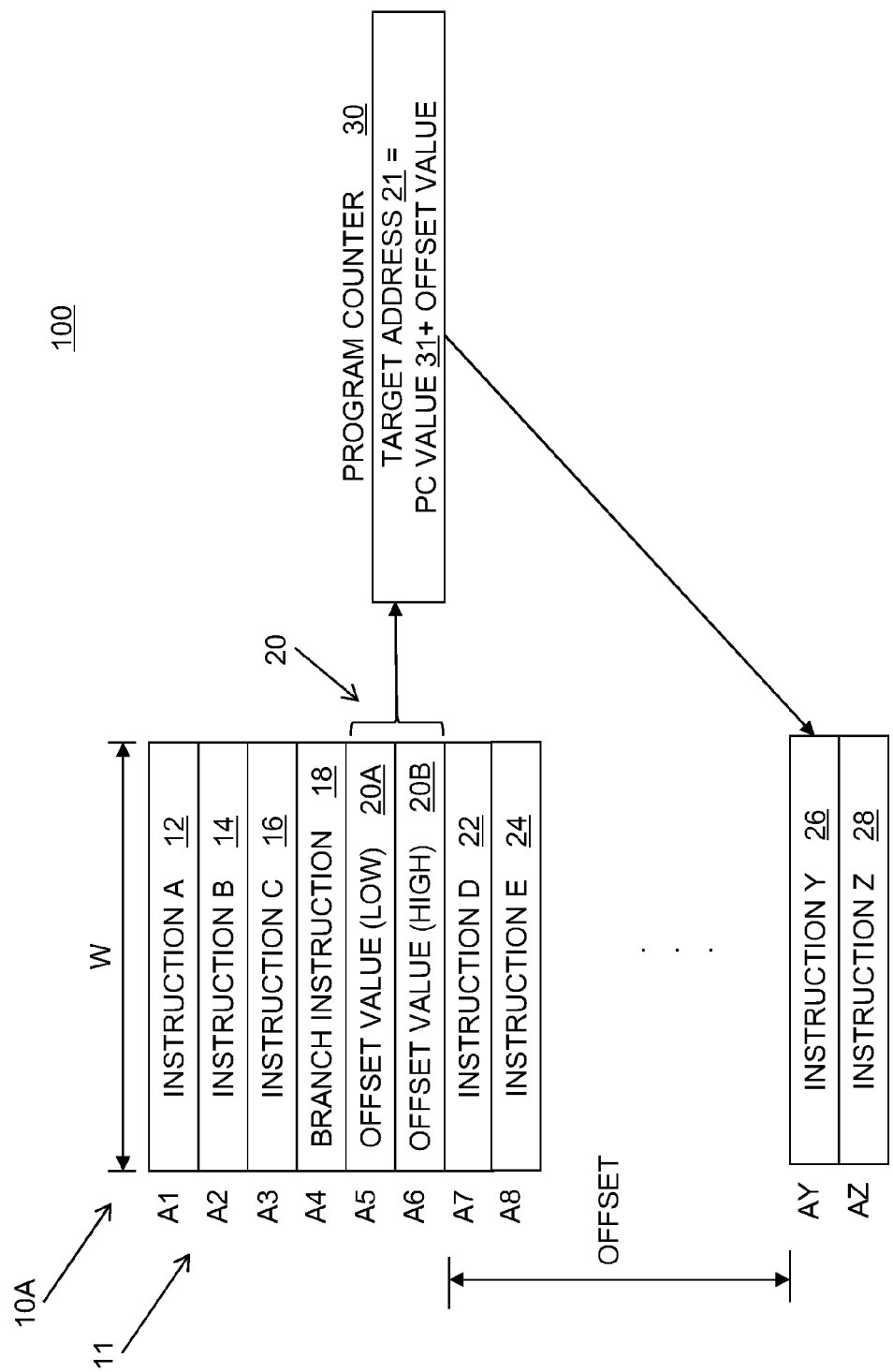
FIG. 2 depicts a sequence of instructions including a relative offset branch instruction in accordance with another embodiment.

FIG. 2 depicts a sequence of instructions 10A in the computer system 100 in accordance with another embodiment. The sequence of instructions 10A is also referred to as instruction stream 10A. Similar to the sequence of instructions 10 of FIG. 1, the sequence of instructions 10A may reside in memory 11, such as a cache memory or main memory of the computer system 100. In the example of FIG. 2, the sequence of instructions 10A includes: instruction A 12 at address A1, instruction B 14 at address A2, instruction C 16 at address A3, branch instruction 18 at address A4, a relative offset value 20 at locations A5 and A6, instruction D 22 at address A7, instruction E 24 at address A8 continuing through instruction Y 26 at address AY and instruction Z 28 at address AZ. Each of the instructions 12-18 and 22-28 is a fixed-width instruction word of W bits. In the example of FIG. 2, the relative offset value 20 is comprised of low relative offset bits 20A at address A5 and high relative offset bits 20B at address A6. The low relative offset bits 20A and high relative offset bits 20B are each W-bits wide such that the relative offset value 20 is formatted as a relative offset and sized as a multiple of the fixed instruction width W, i.e., 2×W in this example. The order of the low relative offset bits 20A and the high relative offset bits 20B can vary depending on a big-endian versus a little-endian implementation.

Similar to the example of FIG. 1, the relative offset value 20, including the low relative offset bits 20A and the high relative offset bits 20B, is added with a program counter value 31 to form a branch target address value 21. The branch target address value 21 is loaded into the program counter 30 to redirect execution of the instruction stream 10A to instruction Y 26 at address AY as the next instruction rather than a next sequential instruction after the branch instruction 18, i.e., instruction D 22 at address A7. Note that in the example of FIG. 2, a return address from address AY is address A7 rather than address A6. Therefore, the computer system 100 must recognize the difference between the embodiments of FIGS. 1 and 2 to ensure that the proper number of bits is used for the relative offset value 20, and the next sequential instruction (instruction D 22) after the branch instruction 18 is located correctly. In another embodiment, offset value LOW and offset value HIGH may be stored with a high order value first. In yet another embodiment, the order of high or low components may be responsive to the setting of a machine state register MSR [LE] bit indicating "big-endian" (HIGH first) and "little-endian" (LOW first behavior). In another embodiment, the order of high and low values are responsive to the combination of MSR[LE] and MSR[SLE], e.g., based on the value of MSR[LE] xor MSR[SLE]. In yet another embodiment, the order of low and high values is fixed and not responsive to an MSR endian setting even when such an endian setting exists.

While the examples of FIGS. 1 and 2 depict a branch from a lower address to a higher address, it will be understood that embodiments include branching to higher and lower addresses. Relative offset branching can be implemented using unconditional or conditional branches. Differences in the width of the relative offset value 20 between FIGS. 1 and 2 can be reflected in an op-code, flag, or other bit(s) in the branch instruction 18 depending upon formatting preferences. In one embodiment, an addressing mode of the computer system 100 is selectable, and the relative offset value 20 width is based on the current addressing mode of the computer system 100.

For example, in one exemplary embodiment based on the Power ISA, where two execution modes are supported for 32-bit and 64-bit addresses by selecting one of two modes with an MSR bit "SF", when executing an instruction in MSF[SF]=0 mode (32-bit addressing) an exemplary branch instruction may have a 32-bit offset in accordance with the embodiment of FIG. 1, and when executing an instruction in MSF[SF]=1 mode (64-bit addressing) an exemplary branch instruction may have a 64-bit offset in accordance with the embodiment of FIG. 2. In another embodiment, a first branch instruction may have an offset of 32 bits regardless of the MSR[SF] mode selection, and a second branch instruction may have an offset of 64 bits when the MSR[SF] mode indicates 64-bit addressing (MSR[SF]=1).

Figure 3A:
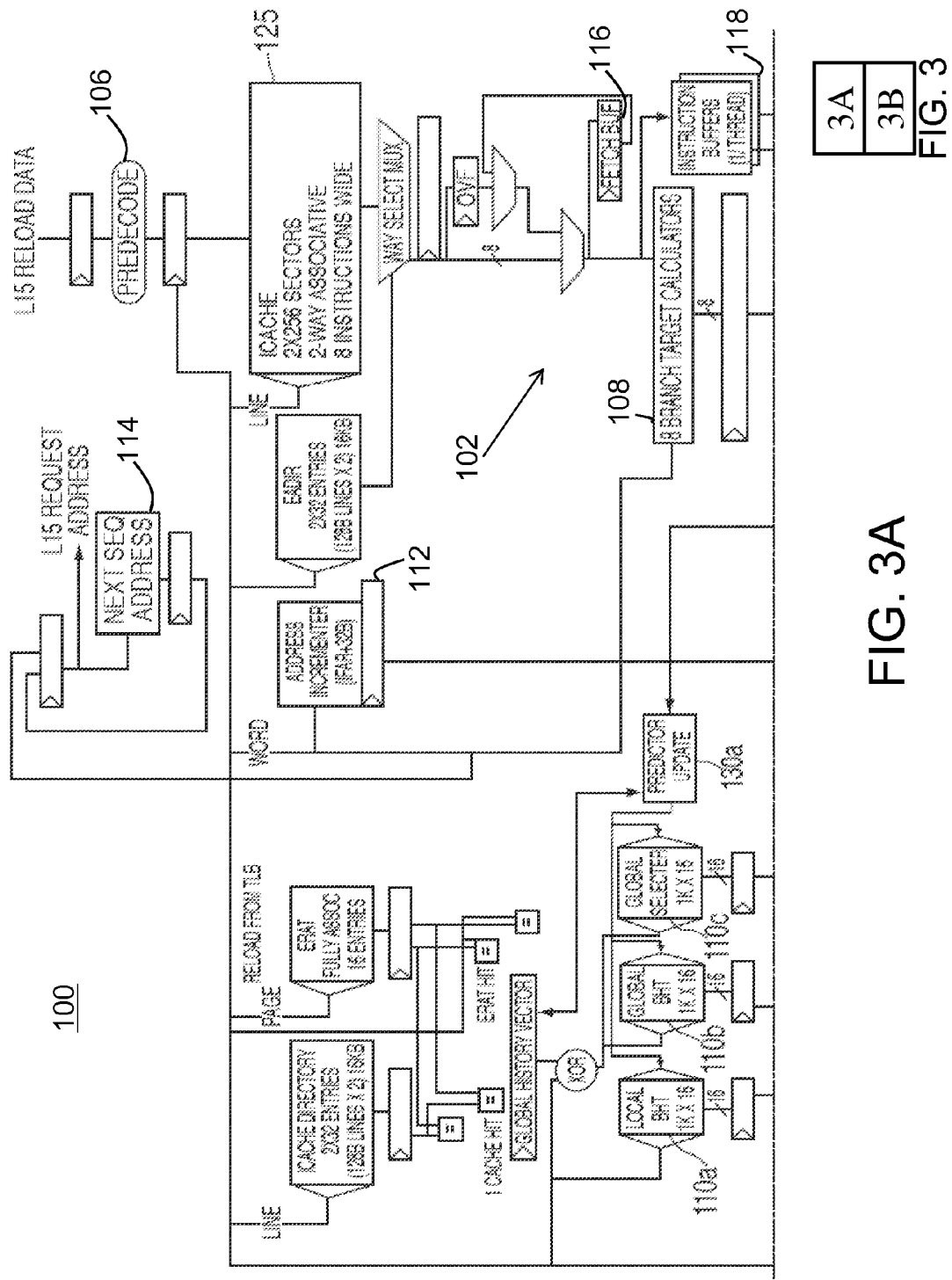
FIG. 3 is formed of partial views FIG. 3A and FIG. 3B, and depicts a computer system that is operable to perform a relative offset branch instruction in accordance with an embodiment.
Figure 3B:
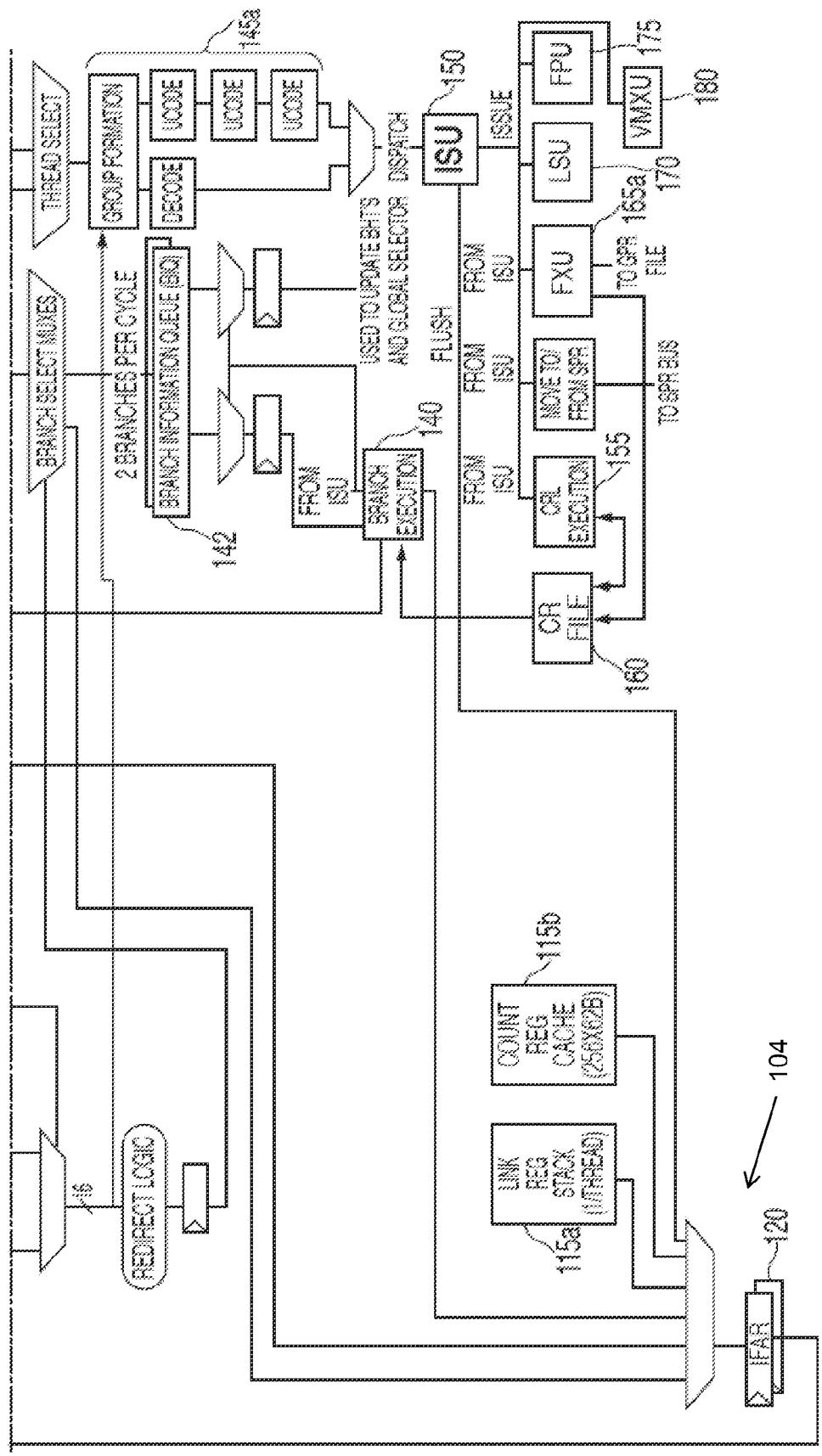

FIG. 3 depicts a computer system 100 that is operable to perform a relative offset branch instruction in accordance with an embodiment. The computer system 100 may be embodied in a RISC processor that includes, among other things, prediction hardware, registers, caches, decoders, an instruction sequencing unit (ISU) 150, and instruction execution units. The prediction hardware includes Local Branch History Table (BHT) 110a, Global Branch History Table (BHT) 110b, and Global Selector 110c. The prediction hardware is accessed through an Instruction Fetch Address Register (IFAR) 120, which has the address for the next instruction fetch. In one embodiment, an instruction cache 125 fetches a plurality of instructions referred to as an "instruction group". The instruction cache 125 is an example of memory that is communicatively coupled to a processing circuit 102, where the processing circuit 102 can include a number of functional units to select and buffer entries from the instruction cache 125 and calculate branch target address values.

The cache and prediction hardware are accessed at approximately the same time with the same address. If the prediction hardware has prediction information available for an instruction in the instruction group, that prediction is forwarded to the ISU 150, which, in turn, issues instructions to various units for execution. The prediction may be used to update the IFAR 120 in conjunction with branch target calculation and branch target prediction hardware (such as a link register prediction stack and a count register cache). If no prediction information is available, but the instruction decoders find a branch instruction in the instruction group, a prediction is created for that instruction group, stored in the prediction hardware and forwarded to the ISU 150.

A Branch Execution Unit (BRU) 140 operates in response to instructions issued to it by the ISU 150. The BRU 140 has read access to a condition register file 160. The BRU 140 further has access to information stored by the branch scan logic in a Branch Information Queue 142, to determine the success of a branch prediction, and is operatively coupled to the instruction fetch address register(s) (IFAR) 120 corresponding to one or more threads. The BRU 140 is further operatively coupled to cause a predictor update when the BRU 140 discovers a branch misprediction.

When an instruction is executed, the BRU 140 detects if the prediction is wrong. If so, the prediction needs to be updated. For this purpose, the computer system 100 in FIG. 3 also includes predictor update logic 130a. The predictor update logic 130a is responsive to an update indication from the BRU 140 and is configured to update array entries in one or more of the Local BHT 110a, Global BHT 110b, and Global Selector 110c. The predictor hardware 110a, 110b, and 110c may have write ports distinct from the read ports used by the instruction fetch and prediction operation, or a single read/write port may be shared. The predictor update logic 130a may further be operatively coupled to a link register stack 115a and count register stack 115b.

Referring now to a condition register file (CRF) 160, the CRF 160 is read-accessible by the BRU 140 and can be written by execution units, including but not limited to a Fixed Point Unit (FXU) 165a, Floating Point Unit (FPU) 175 and Vector Multimedia eXtension Unit (VMXU) 180. A Condition Register Logic Execution unit (CRL execution) 155 (also referred to as the CRU) and SPR handling logic have read and write access to the Condition Register File (CRF) 160 (access to CRF 160 from SPR handling logic not shown in the interest of simplifying illustration). The CRU 155 performs logical operations on the condition registers stored in the CRF 160. The FXU 165a is able to perform write updates to the CRF 160.

Instructions can be issued at the ISU 150, which is relatively far removed from the predictor hardware. In accordance with an exemplary embodiment, a prediction is made and provided in conjunction with a decode sequence, or as an immediate data word provided with the decode sequence, or an internal operation bit of an instruction.

Those skilled in the art will understand that a variety of predictor architectures can be used, and the predictors of FIG. 3 are shown by way of example only. In an exemplary embodiment, a predictor for branch prediction and prediction-based decoding may be shared. In another embodiment, there may be separate predictors, separated in either a logical or a physical fashion.

Access may be provided to prediction bits during an instruction fetch phase to one or more blocks of logic including a group formation unit, decoding logic, and cracking and microcode logic, which breaks up a macro instruction into a plurality of internal operations to enable such logic to modify instruction decode and cracking in response to prediction values. These blocks of logic are collectively labeled as 145a in FIG. 3 and may be collectively referred to below as "decode logic" or instruction decode unit (IDU) 145a.

According to an exemplary embodiment, when a branch instruction is executed in the branch execution unit BRU 140, NRU 140 confirms correctness of prediction. In accordance with one such embodiment, the predicted target address, and/or the predicted taken/not taken decision are compared to the computed branch target address and taken/not taken decision of executing the branch instruction. When the prediction is incorrect, a branch misprediction flush occurs and a new fetch address is established in conjunction with the computed address and branch taken/not taken decision. In addition, a branch predictor is updated. In accordance with at least one embodiment, a branch predictor may also be updated when a prediction is correct to track prediction confidence.

According to an exemplary embodiment, logic is provided to establish correctness of predictions and to update predictions in response to the correctness and/or incorrectness of a prediction. This logic can include the FXU 165a, which may determine the correctness of a prediction having been used in predictive decoding. In an exemplary embodiment, the prediction is encoded in an internal operation of a checking instruction. In another embodiment, the prediction is provided as an operand to the FXU 165a by the ISU 150 when instructions are issued. In one embodiment, this dataflow is simplified, by executing a sequence adapted to transfer from the FXU 165a to a microarchitectural condition register ("eCR") in the CR file 160 an indication about the correctness and/or incorrectness of a prediction as part of an FXU instruction determining such correctness or incorrectness. Read-access of the indication is provided in a subsequent internal operation injected by decode logic directed to the BRU 140, and an update is indicated to the predictor update logic by the subsequent internal operation based on the value recorded in an eCR and provided as input to the subsequent internal operation. In one embodiment, the FXU 165a is operatively coupled to the ISU 150 to generate a pipeline flush and force a re-decode in response to an incorrect prediction.

According to an exemplary embodiment, logic may also be provided to establish a prediction when none is found in response to encountering an instruction to be decoded using prediction-based decode, and using a default prediction when none is found. In one embodiment, this logic is coupled to group formation and decode logic.

A combination of blocks may be collectively referred to as an Instruction Fetch Unit (IFU) 104. The IFU 104 can include, among other things, the IFAR 120 and logic to control fetching of instructions from the instruction cache 125.

The program counter 30 of FIGS. 1 and 2 may be part of the IFAR 120 or another register within the computer system 100. To efficiently implement relative offset branching, a number of options are available to access the relative offset value 20 of FIGS. 1 and 2 in combination with the branch instruction 18 of FIGS. 1 and 2, where the branch instruction 18 is a relative offset branch instruction that relies upon the relative offset value 20. In an exemplary embodiment, branch instructions 18 are fetched simultaneously with offset values 20. In such an embodiment, when an instruction is fetched, and the offset is available, a branch target can be directly computed using the offset and the program counter value (e.g., one of A4, A5 and A6 in accordance with FIG. 1, or one of A4, A5, A6 and A7 in accordance with FIG. 2).

Since the branch instruction 18 of FIGS. 1 and 2 is in a separate instruction word, it may be loaded by instruction fetch logic from the instruction cache 125 while the relative offset value 20 of FIGS. 1 and 2 is not received. In one exemplary execution, this is because the offset is in another cache line, or instruction group fetched into fetch buffer 116.

In another embodiment, the target address does not reside in the instruction cache 125. In a multi-threaded embodiment, the chances of sequential words for a same thread failing to both be simultaneously fetched from the instruction cache 125 can increase as more threads share the instruction cache 125. In one embodiment, fetching is performed in groups of at least two or three instruction words as a fetch instruction group into fetch buffer 116. In another embodiment, instruction decode groups are created in groups of at least two or three instructions into decode logic 145a. In one embodiment, programming tools or programmers may align instructions within the code such that the branch instruction 18 and offset value 20 are concurrently fetched into fetch buffer 116, so branch target calculators 108 may process them simultaneously. A predecode unit 106 may be used to mark branch instructions in the instruction stream and to modify instruction group decode alignment such that branch instructions are the first instruction word in an instruction decode group processed by group formation and decode 145a. Each instruction group can be written to the instruction cache 125 such that delays associated with the branch instruction 18 of FIGS. 1 and 2 failing to have the relative offset value 20 of FIGS. 1 and 2 readily available are reduced.

In another embodiment, microcode can be generated to fetch or load one or more words after the branch instruction 18 of FIGS. 1 and 2 using internal operations within the computer system 100. As one example, when a fetched instruction group includes a branch instruction 18 but does not include the relative offset value 20 of FIGS. 1 and 2, an additional fetch can be triggered to access the relative offset value 20 such that the branch instruction 18 can be executed. In one embodiment, this fetch is performed by the instruction fetch unit. In another embodiment, this fetch is performed by microcode generated in response to decoding a branch instruction 18 without branch offset value 20. In another example, when the fetched instruction group includes the relative offset value 20 of FIGS. 1 and 2, the branch instruction 18 of FIGS. 1 and 2 can be directly executed within the IFU 104 by adding the relative offset value 20 to the program counter value 31 of FIGS. 1 and 2 in the IFAR 120.

When the fetched instruction group includes a branch instruction 18 of FIGS. 1 and 2 but does not include the relative offset value 20 of FIGS. 1 and 2, decoding can be performed by the IDU 145a and microcode internal operations generated to retrieve instruction address values, load a next word after the branch instruction 18 of FIGS. 1 and 2, and update the program counter 30 of FIGS. 1 and 2 with the sum of the program counter value 31 of FIGS. 1 and 2 and the relative offset value 20. The instruction address values, such as a current instruction address and a next instruction address, can be retrieved using the IFAR 120, address incrementer 112 and next sequential address value 114 using the BRU 140. Loading of a next word can be performed by a Load-Store Unit (LSU) 170, and updating of the program counter 30 of FIGS. 1 and 2 can be performed by the ISU 150 and/or the BRU 140. A fetch buffer 116 and an instruction buffer 118 can also be used to buffer the instruction groups to include both the branch instruction 18 of FIGS. 1 and 2 and the relative offset value 20 of FIGS. 1 and 2.

The predictor hardware 110a, 110b, and 110c can be used in combination with the predictor update logic 130a, link register stack 115a, count register stack 115b, and branch target calculators 108 to attempt to predict the branch target address value 21 of FIGS. 1 and 2. The link register stack 115a and count register stack 115b can be used as predictors and accessed by the branch target calculators 108 as most likely outcomes associated with a particular branch instruction, such as the branch instruction 18 of FIGS. 1 and 2. Most frequent branch targets can be tracked in the branch target predictor hardware 115a and 115b, and branch prediction taken/not taken decisions by branch direction predictors 110a, 110b, and 110c. A predicted branch target can be used to predictively fetch, decode, and execute instructions until the prediction is verified. Once the branch target address value 21 of FIGS. 1 and 2 is determined, it is compared against the predicted branch target to verify the prediction. If the prediction was correct, fetching, decoding, and executing of instructions continues as predicted; otherwise, the predictor update logic 130a can update the prediction, flush the incorrectly predicted instructions, and execute the branch instruction 18 of FIGS. 1 and 2 using the branch target address value 21 of FIGS. 1 and 2.

In some embodiments, virtual memory is supported and address translation is performed from at least one first type of address (e.g., an effective or virtual address) to a second type of address (e.g., a physical or real address). In some embodiments, different and/or distinct architectural and microarchitectural mechanisms are employed to perform instruction and data address translation. Depending on whether the relative offset value 20 of FIGS. 1 and 2 is fetched as an instruction access or loaded as a data access, different types of address translation may be performed. When offset value 20 is fetched by the IFU, the effective address used for instruction fetch (e.g., a PC or IFAR) of the instructions A, B, C, branch instruction 18, instruction D of FIGS. 1 and 2 are translated by instruction address translation facilities and in conjunction with an architectural definition of instruction address translation used in conjunction with instruction fetch. In one embodiment, when the offset value 20 is fetched in conjunction one or more instructions, and in particular in conjunction with branch instruction 18, the offset value's address in real or physical memory is established by instruction address translation facilities and in conjunction with an architectural definition of instruction address translation used in conjunction with instruction fetch.

In one embodiment, when offset value 20 is fetched as data by the LSU 170 (e.g., in response to microcode generated responsive to a branch instruction 18 to fetch offset value 20), in at least one embodiment, the address of the instruction corresponding to the offset value is translated by data address translation facilities operatively coupled with the LSU 140. In at least one embodiment in accordance with the teachings herein, the address translation facility operatively coupled to LSU 140 is equipped to translate addresses in accordance with instruction address translation and data address translation definitions in accordance with an ISA. In accordance with one such embodiment, when LSU 140 fetches offset value 140, it transmits the address of offset value 20 to such address translation facilities and in conjunction with at least one bit to indicate translation using the architectural instruction address translation definition. In another embodiment, LSU 140 is operatively coupled to two address translation facilities, one directed at translating data address and one directed at translation instruction address, the latter possibly shared with instruction fetch unit IFU. In one such embodiment, the LSU 140 used the instruction address facility to translate the address of offset value 20. In another embodiment, an address translation facility operatively coupled to LSU 140 is equipped to translate addresses only in accordance address translation definitions in accordance with a data address accesses. In accordance with one such embodiment optimized for reduced implementation complexity, when LSU 140 fetches offset value 140, it transmits the address of offset value 20 to such address translation facilities and a translation in accordance with data address translation is returned. In one such embodiment, instruction text is mapped as accessible data to access the relative offset value 20 of FIGS. 1 and 2 via the LSU 170 using data translation. In an alternate embodiment, the LSU 170 uses instruction translation when accessing the relative offset value 20 of FIGS. 1 and 2. Address translations can include mapping effective addresses to physical addresses. Additionally, data values may be accessed as byte addresses while instructions are accessed as word addresses. Depending upon implementation constraints, the relative offset value 20 of FIGS. 1 and 2 is adjusted as needed to specify a relative offset to form a target of the branch instruction 18 of FIGS. 1 and 2.

A software-based approach to keep the branch instruction 18 of FIGS. 1 and 2 grouped with the relative offset value 20 of FIGS. 1 and 2 in the instruction cache 125 includes enforcement by a compiler of boundaries and alignment of the branch instruction 18 in combination with the relative offset value 20. For example, a compiler can count instructions and use knowledge of the size of the instruction cache lines, instruction cache sublines, and/or instruction fetch widths corresponding to instruction cache 125 to prevent placement of the branch instruction 18 of FIGS. 1 and 2 at a last location in a cache line, cache subline, cache sector, instruction fetch block, instruction fetch group, instruction decode group or other unit in the instruction cache 125 at compile time.

As previously described, the branch instruction 18 of FIGS. 1 and 2 may be implemented as an unconditional branch or a conditional branch. To support conditional branches, CRU 155 can perform logical operations on the condition registers stored in the CRF 160. When a condition is confirmed, the BRU 140 is notified such that the branch instruction 18 of FIGS. 1 and 2 can be executed. If a condition is not met, then the next sequential address 114 is adjusted to skip over the relative offset value 20 of FIGS. 1 and 2 to avoid interpreting it as an instruction.

The branch instruction 18 of FIGS. 1 and 2 may also be formatted, e.g., using a link bit, to define whether storing a return address to a link register in the link register stack 115a should be performed. When storing a return address is requested, the associated link register and the prediction value in the link register stack 115a is updated to account for the size of the relative offset value 20 of FIGS. 1 and 2. In a multi-threaded embodiment, each thread can have a separate link register predictions in a link register stack 115a on a per-thread basis.

It will be understood that although a number of logical blocks and connections between them are depicted in FIG. 3, additional logical blocks and connections can be included within the computer system 100. Functions described herein can be redistributed between the logic blocks depicted in FIG. 3, combined, or further distributed into other logical blocks not otherwise depicted in this example.

Figure 4:
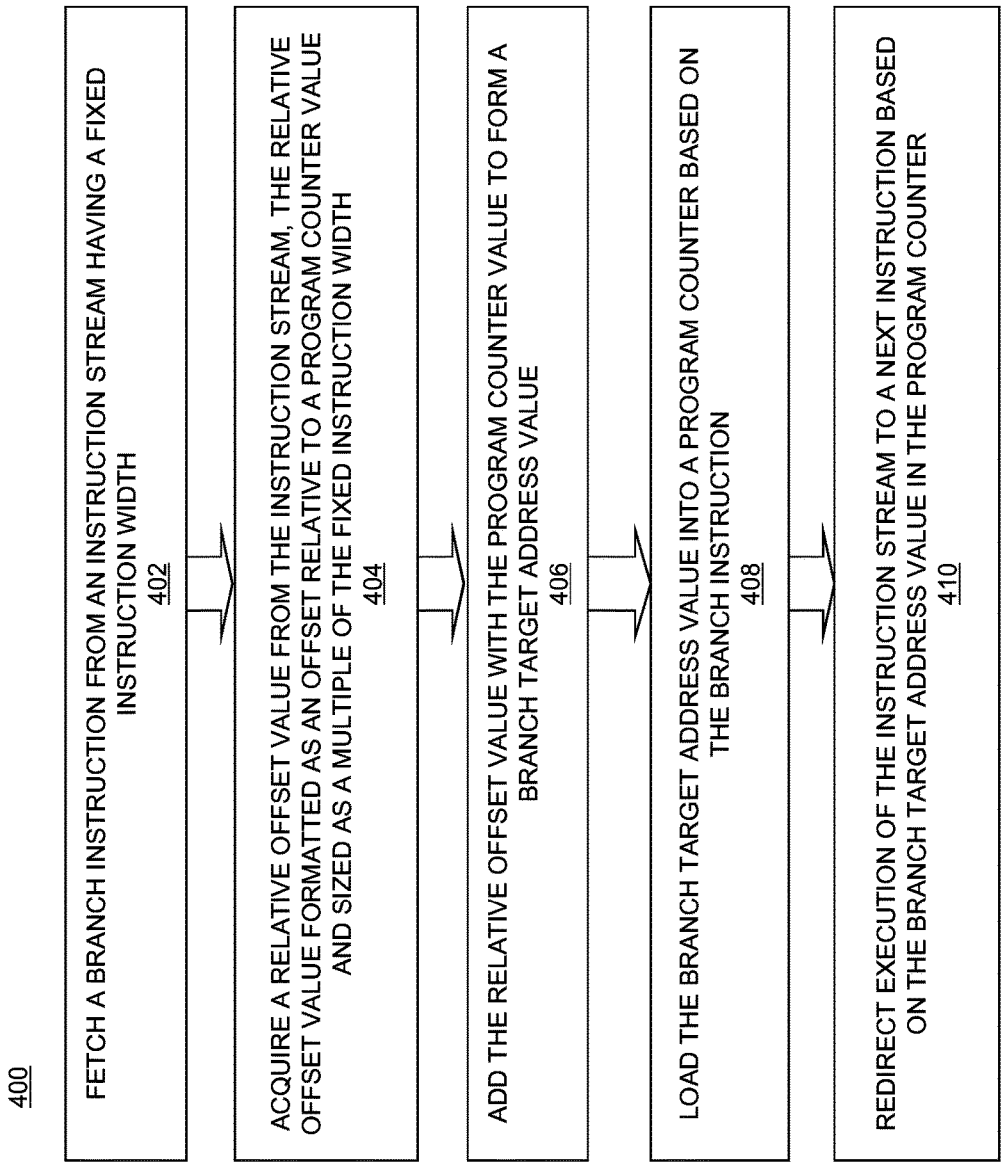
FIG. 4 depicts a process flow for a relative offset branch instruction in accordance with an embodiment.

FIG. 4 depicts a process flow 400 for a relative offset branch instruction in accordance with an embodiment. The process flow 400 can be implemented in the computer system 100 of FIGS. 1-3. For purposes of explanation, the process flow 400 is described in reference to the embodiments of FIGS. 1 and 3. At block 402, a branch instruction 18 is fetched from an instruction stream 10 having a fixed instruction width W. For example, the IFU 104 can fetch the branch instruction 18 from the instruction cache 125.

At block 404, a relative offset value 20 is acquired from the instruction stream 10. The relative offset value 20 is formatted as an offset relative to a program counter value 31 and sized as a multiple of the fixed instruction width W, e.g., 1×W, 2×W, 3×W, 4×W, etc. The branch instruction 18 can be marked to support fetching an instruction group from memory using the marking to ensure that the instruction group is sized and aligned such that a number of words after the branch instruction 18 in the instruction group includes the relative offset value 20. Marking can be done, for instance, by the predecode unit 106. The relative offset value 20 can be acquired as part of a fetch or as a data access. For example, instruction text that includes the relative offset value 20 can be mapped as data accessible. The relative offset value 20 may be accessed via the LSU 170 using data translation. Alternatively, the relative offset value 20 can be acquired from the instruction stream 10 by LSU 170 using instruction translation.

At block 406, the relative offset value 20 is added with the program counter value 31 to form a branch target address value 21. At block 408, the branch target address value 21 is loaded into a program counter 30 based on the branch instruction 18. If the branch instruction 18 is a conditional branch, the loading of the branch target address value 21 into the program counter 30 is further based on determining that a branch condition associated with the branch instruction 18 is satisfied.

At block 410, execution of the instruction stream 10 is redirected to a next instruction, such as instruction Y 26 at address AY, based on the branch target address value 21 in the program counter 30.

When linking is supported to store a return address, a determination can be performed as to whether an update to a link register in the link register stack 115a is requested with the branch instruction 18. Based on determining that the update to the link register is requested with the branch instruction 18, an address of the branch instruction 18 plus an offset value that accounts for the fixed instruction width W and a width of the relative offset value 20 can be written to set a return address in the link register to a next sequential instruction (i.e., instruction D 22) after the branch instruction 18.

Figure 5:
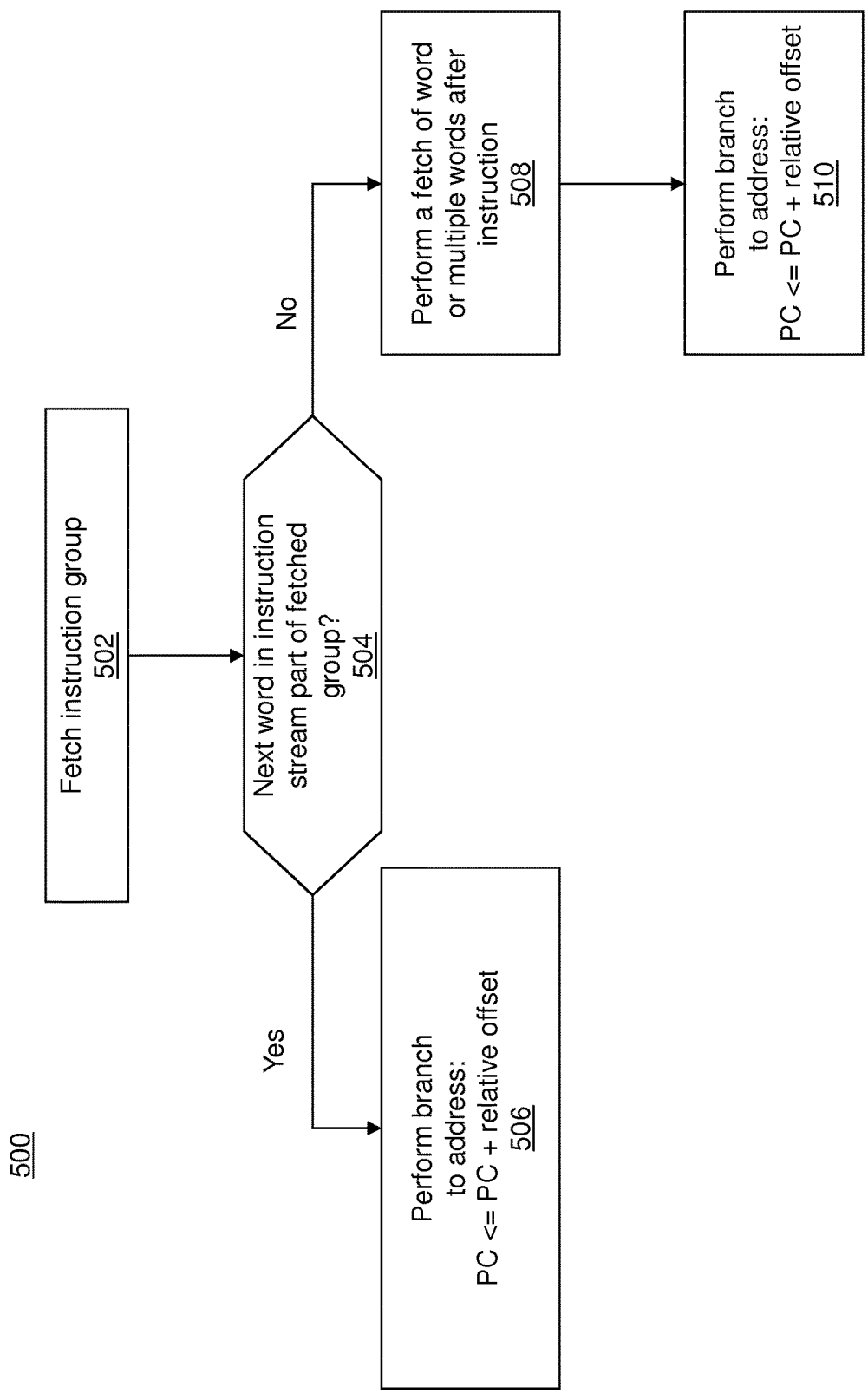
FIG. 5 depicts a process flow for a relative offset branch instruction in accordance with another embodiment.

FIG. 5 depicts a process flow 500 for a relative offset branch instruction in accordance with another embodiment. The process flow 500 represents an alternate embodiment for portions of the process flow 400 of FIG. 4. The process flow 500 can be implemented in the computer system 100 of FIGS. 1-3. For purposes of explanation, the process flow 500 is described in reference to the embodiments of FIGS. 1 and 3. At block 502, an instruction group is fetched from a memory. At block 504, it is determined whether the instruction group includes the relative offset value 20. The determination can be made by identifying the branch instruction 18 in the instruction group and checking whether the next word in the instruction stream 10 was also fetched as part of the instruction group.

At block 506, based on determining that the instruction group includes the relative offset value 20, the program counter 30 is loaded with the program counter value 31 plus the relative offset value 20, and execution of the instruction stream 10 is redirected. At block 508, based on determining that the instruction group does not include the relative offset value 20, another fetch after the branch instruction 18 is performed. The fetch can be a single word or multiple words after the branch instruction 18 depending on the size of the relative offset value 20. At block 510, a branch is performed to the program counter value 31 plus the relative offset value 20 in the program counter 30.

Figure 6:
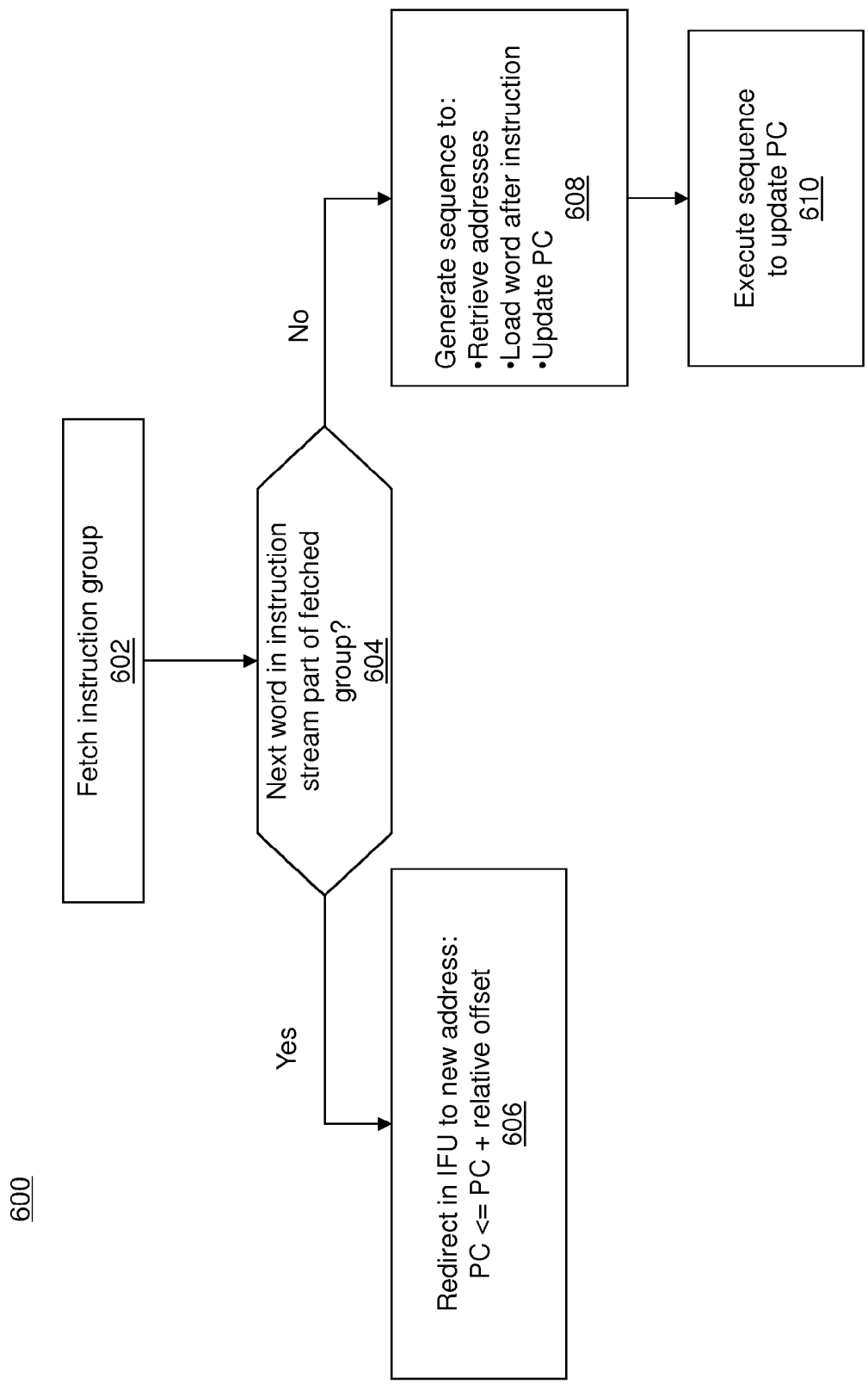
FIG. 6 depicts a process flow for a relative offset branch instruction in accordance with a further embodiment.

FIG. 6 depicts a process flow 600 for a relative offset branch instruction in accordance with a further embodiment. The process flow 600 represents an alternate embodiment for portions of the process flow 400 of FIG. 4. The process flow 600 can be implemented in the computer system 100 of FIGS. 1-3. For purposes of explanation, the process flow 600 is described in reference to the embodiments of FIGS. 1 and 3. At block 602, an instruction group is fetched from memory. At block 604, it is determined whether the instruction group includes the relative offset value 20. The determination can be made by identifying the branch instruction 18 in the instruction group and checking whether the next word in the instruction stream 10 was also fetched as part of the instruction group.

At block 606, based on determining that the instruction group includes the relative offset value 20, redirecting is performed in the IFU 104 to a new address such that the program counter value 31 plus the relative offset value 20 is loaded into the program counter 30, and execution of the instruction stream 10 is redirected.

At block 608, based on determining that the instruction group does not include the relative offset value 20, an internal operation sequence is generated. The internal operation sequence can include microcode to retrieve addresses, such as a current instruction address and a next instruction address, and use the retrieved addresses to load one or more words after the branch instruction 18 depending on the size of the relative offset value 20. The generated microcode can also include an update to the program counter 30 such that the program counter value 31 plus the relative offset value 20 is loaded into the program counter 30.

At block 610, the internal operation sequence is executed in the BRU 140 and the LSU 170 to load the relative offset value 20 from the memory and update the program counter 30. For example, the BRU 140 can retrieve the addresses, the LSU 170 can load the relative offset value 20, and the BRU 140 or the LSU 170 can update the program counter 30. A branch is then performed to the program counter value 31 plus the relative offset value 20 in the program counter 30.

Figure 7:
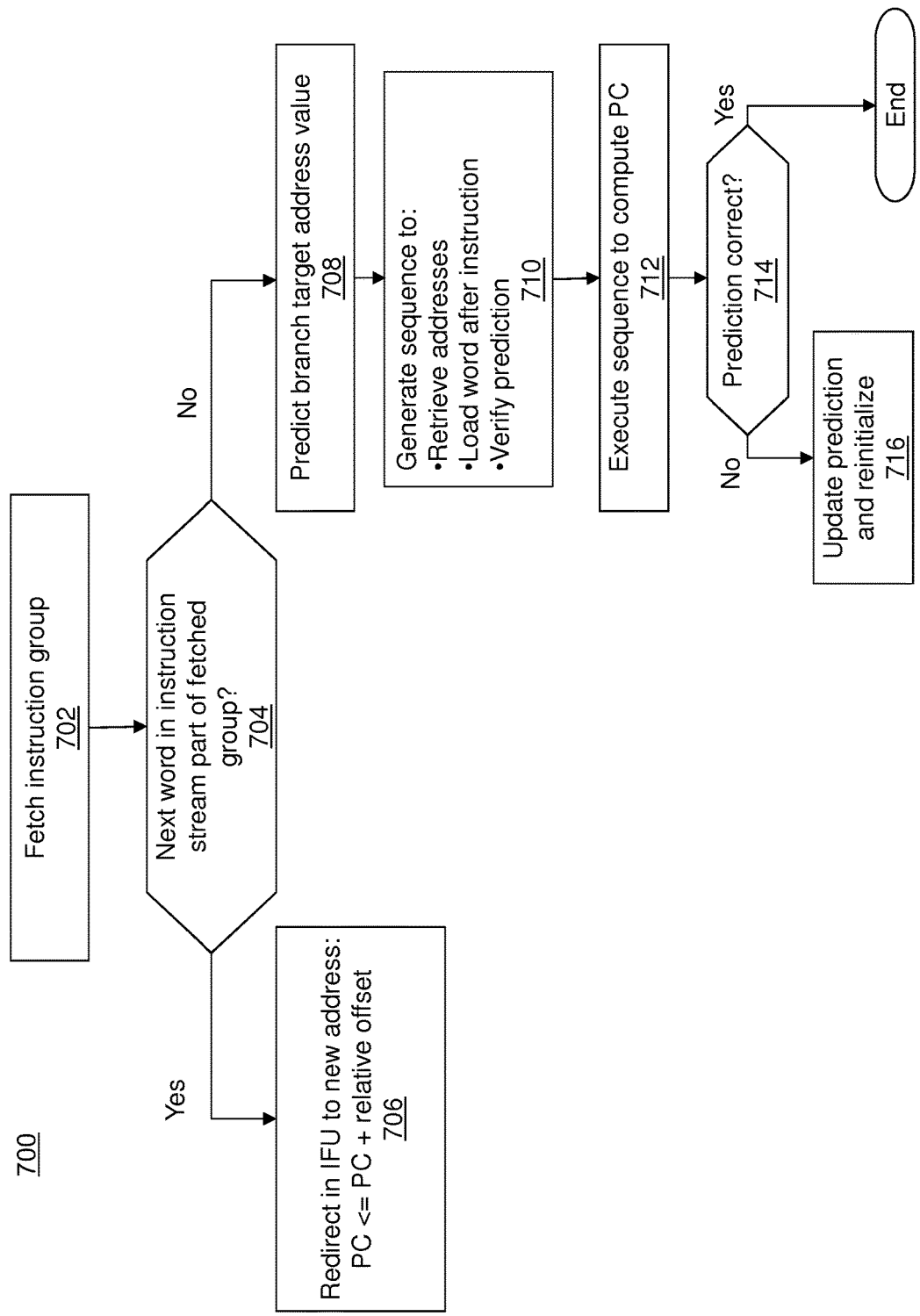
FIG. 7 depicts a process flow for a relative offset branch instruction in accordance with another embodiment.

FIG. 7 depicts a process flow 700 for a relative offset branch instruction in accordance with another embodiment. The process flow 700 represents an alternate embodiment for portions of the process flow 400 of FIG. 4. The process flow 700 can be implemented in the computer system 100 of FIGS. 1-3. For purposes of explanation, the process flow 700 is described in reference to the embodiments of FIGS. 1 and 3. At block 702, an instruction group is fetched from memory. At block 704, it is determined whether the instruction group includes the relative offset value 20. The determination can be made by identifying the branch instruction 18 in the instruction group and checking whether the next word in the instruction stream 10 was also fetched as part of the instruction group.

At block 706, based on determining that the instruction group includes the relative offset value 20, redirecting is performed in the IFU 104 to a new address such that the program counter value 31 plus the relative offset value 20 (i.e., branch target address value 21) is loaded into a program counter 30, and execution of the instruction stream 10 is redirected.

At block 708, prediction logic is used to predict the branch target address value and to speculatively start fetching and executing instructions in accordance with the predicted target address. At block 710, an internal operation sequence is generated to load a value after the branch instruction 18 and verify whether the branch target address value 21 matches the prediction of the branch target address value. The internal operation sequence can include microcode to retrieve addresses, such as a current instruction address and a next instruction address, and use the retrieved addresses to load one or more words after the branch instruction 18 depending on the size of the relative offset value 20. The internal operation sequence can also verify the prediction by comparing the prediction to the branch target address value 21.

At block 712, the internal operation sequence is executed to compute the branch target address to be loaded to the program counter 30 in accordance with the sequence of steps generated in block 710 and the architectural definition of the branch of FIGS. 1 and 2. At block 714, the computed target address to be loaded into the program counter 30 in accordance with the architectural definition of the branch instructions is compared to the predicted address and a determination as to whether the prediction is correct is made.

At block 716, based on determining that the prediction was incorrect, the prediction of the branch target address value is updated and the prediction logic is reinitialized to flush results of the incorrect prediction. The program counter 30 is also updated with the branch target address value 21. If the prediction was correct at block 714, then the process flow 700 ends. A correct prediction may also update a prediction history value to indicate an increased prediction confidence level.

In accordance with at least one embodiment, a prediction for a branch target address can be stored in a target address predictor structure targeted at predicting count registers. In another embodiment, another target address prediction structure is used.

Technical effects and benefits include relative offset branching in a reduced instruction set computing (RISC) architecture by using one or more locations after a branch instruction as a relative offset value. The relative offset value can be allocated as an integer multiple of the fixed instruction width of the RISC instruction set.

Figure 8:
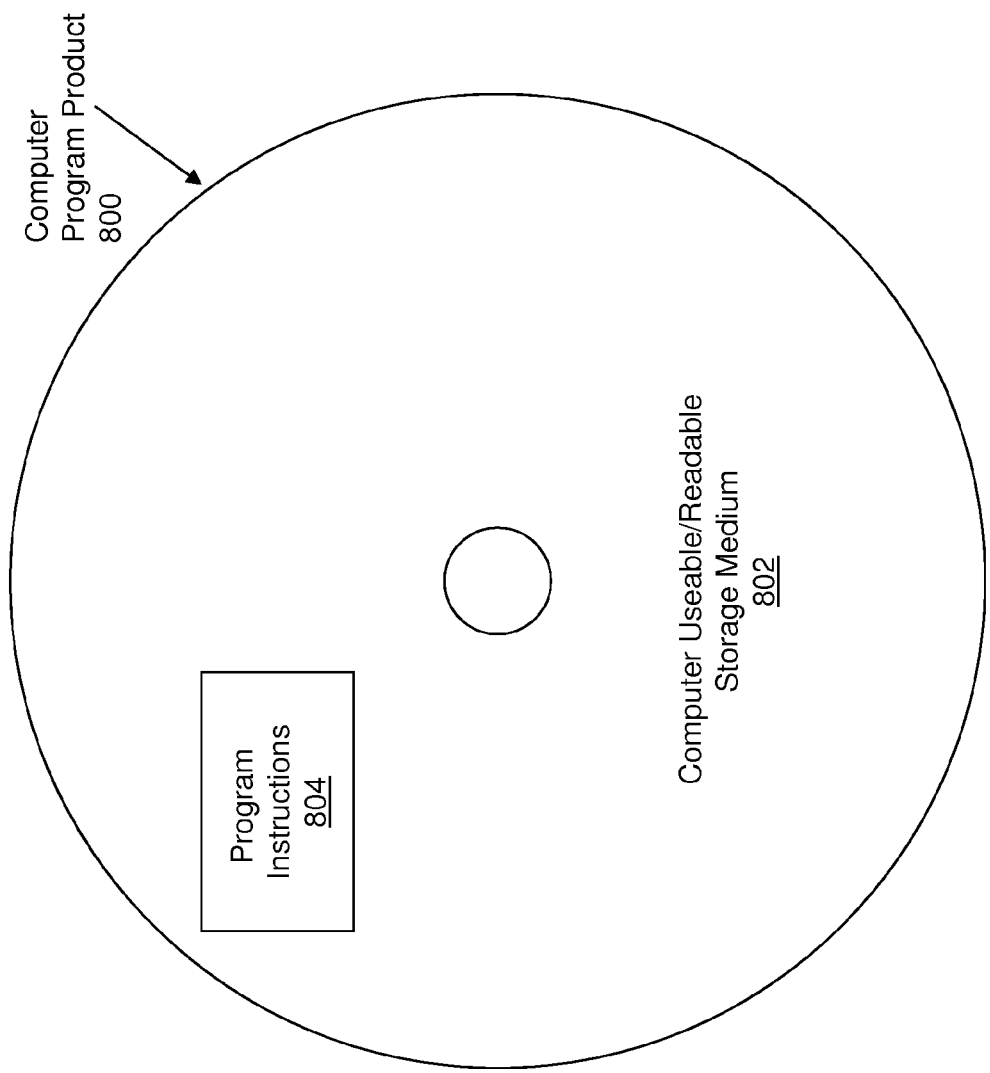
FIG. 8 depicts a computer-readable medium according to an embodiment.

Referring now to FIG. 8, a computer program product 800 in accordance with an embodiment that includes a computer readable storage medium 802 and program instructions 804 is generally shown.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for relative offset branching in a reduced instruction set computing (RISC) architecture, the method comprising:
    fetching an instruction group from a memory comprising a branch instruction of an instruction stream having a fixed instruction width;
    determining whether the instruction group includes the branch target address value;
    acquiring a relative offset value from the instruction stream, the relative offset value formatted as an offset relative to a program counter value and sized as a multiple of the fixed instruction width;
    adding the relative offset value with the program counter value to form a branch target address value;
    loading the branch target address value into a program counter based on the branch instruction;
    redirecting execution of the instruction stream to a next instruction based on the branch target address value in the program counter and determining that the instruction group includes the branch target address value; and
    based on determining that the instruction group does not include the branch target address value, generating and executing an internal operation sequence in a branch execution unit and a load-store unit to load the branch target address value from the memory and update the program counter.

2. The method of claim 1, further comprising:
    determining whether an update to a link register is requested with the branch instruction; and
    based on determining that the update to the link register is requested with the branch instruction, writing an address of the branch instruction plus an offset value that accounts for the fixed instruction width and a width of the relative offset value to set a return address in the link register to a next sequential instruction after the branch instruction.

3. The method of claim 1, wherein fetching further comprises:
    marking the branch instruction; and
    using the marking of the branch instruction to ensure that the instruction group is sized and aligned such that a number of words after the branch instruction in the instruction group includes the relative offset value.

4. The method of claim 1, further comprising:
    using prediction logic to predict the branch target address value;
    generating an internal operation sequence to load a value after the branch instruction as the relative offset value and verify whether the branch target address value matches the prediction of the branch target address value; and
    based on determining that the prediction was incorrect, updating the prediction of the branch target address value and reinitializing the prediction logic to flush results of the incorrect prediction.

5. The method of claim 1, further comprising:
    mapping instruction text as data accessible; and
    accessing the relative offset value via the load-store unit using data translation.

6. The method of claim 1, wherein the relative offset value is acquired from the instruction stream by the load-store unit using instruction translation.

7. The method of claim 1, wherein the branch instruction is a conditional branch, and the loading of the branch target address value into the program counter is further based on determining that a branch condition associated with the branch instruction is satisfied.

8. A computer program product for implementing relative offset branching in a reduced instruction set computing (RISC) architecture, the computer program product comprising:
    a computer readable storage medium having program instructions embodied therewith, the program instructions readable by a processing circuit to cause the processing circuit to perform a method comprising:
        fetching an instruction group from a memory comprising a branch instruction from an instruction stream having a fixed instruction width;
        determining whether the instruction group includes the branch target address Value;
        acquiring a relative offset value from the instruction stream, the relative offset value formatted as an offset relative to a program counter value and sized as a multiple of the fixed instruction width;

adding the relative offset value with the program counter value to form a branch target address value;

loading the branch target address value into a program counter based on the branch instruction;

redirecting execution of the instruction stream to a next instruction based on the branch target address value in the program counter and determining that the instruction group includes the branch target address value; and based on determining that the instruction group does not include the branch target address value, generating and executing an internal operation sequence in a branch execution unit and a load-store unit to load the branch target address value from the memory and update the program counter.

9. The computer program product of claim 8, wherein the program instructions further cause the processing circuit to perform the method comprising:

determining whether an update to a link register is requested with the branch instruction; and based on determining that the update to the link register is requested with the branch instruction, writing an address of the branch instruction plus an offset value that accounts for the fixed instruction width and a width of the relative offset value to set a return address in the link register to a next sequential instruction after the branch instruction.

10. The computer program product of claim 8, wherein fetching further comprises:

marking the branch instruction; and using the marking of the branch instruction to ensure that the instruction group is sized and aligned such that a number of words after the branch instruction in the instruction group includes the relative offset value.

11. The computer program product of claim 8, wherein the program instructions further cause the processing circuit to perform the method comprising:

using prediction logic to predict the branch target address value;

generating an internal operation sequence to load a value after the branch instruction as the relative offset value and verify whether the branch target address value matches the prediction of the branch target address value; and based on determining that the prediction was incorrect, updating the prediction of the branch target address value and reinitializing the prediction logic to flush results of the incorrect prediction.

12. The computer program product of claim 8, wherein the program instructions further cause the processing circuit to perform the method comprising:

mapping instruction text as data accessible; and accessing the branch target address value via the load-store unit using data translation.

13. The computer program product of claim 8, wherein the branch target address value is acquired from the instruction stream by the load-store unit using instruction translation.

14. The computer program product of claim 8, wherein the branch instruction is a conditional branch, and the loading of the branch target address value into the program counter is further based on determining that a branch condition associated with the branch instruction is satisfied.

* * * * *